United States Patent [19]

Albright et al.

[11] 4,330,726
[45] May 18, 1982

[54] AIR-GAP WINDING STATOR CONSTRUCTION FOR DYNAMOELECTRIC MACHINE

[75] Inventors: Donald R. Albright, Scotia; Henry F. Sage; James B. Archibald, both of Schenectady, all of N.Y.

[73] Assignee: General Electric Company, Schenectady, N.Y.

[21] Appl. No.: 212,984

[22] Filed: Dec. 4, 1980

[51] Int. Cl.³ .............................................. H02K 1/18
[52] U.S. Cl. .................................. 310/254; 310/179; 310/214
[58] Field of Search ................... 310/65, 179, 52, 259, 310/43, 254, 255, 256, 257, 258, 51, 64, 154, 181, 216–218, 261

[56] References Cited

U.S. PATENT DOCUMENTS

| | | | |
|---|---|---|---|
| 3,082,337 | 3/1963 | Horsley | 310/179 |
| 3,405,297 | 10/1968 | Madsen | 310/258 |
| 3,652,889 | 3/1972 | Reece et al. | 310/259 |
| 4,137,471 | 1/1979 | Sato et al. | 310/51 |
| 4,179,635 | 12/1979 | Beerman | 310/214 |

FOREIGN PATENT DOCUMENTS

| | | | |
|---|---|---|---|
| 372205 | 3/1923 | Fed. Rep. of Germany | 310/217 |
| 1062332 | 7/1959 | Fed. Rep. of Germany | 310/217 |

*Primary Examiner*—J. D. Miller
*Assistant Examiner*—D. L. Rebsch
*Attorney, Agent, or Firm*—John F. Ahern

[57] ABSTRACT

A stator for a dynamoelectric machine preferably comprises a stack of modular sections, each modular section comprising an outer metallic cylinder formed from a plurality of metallic laminations arranged in a plurality of layers. Furthermore, the stator module comprises an inner nonmetallic cylinder formed from nonmetallic laminations having inwardly projecting teeth so as to define a plurality of slots along the inner circumference of the modular sections, the nonmetallic laminations being adhesively bonded to the outer metallic laminations. The stator modules of the present invention may be incorporated either in a conventional air-gap winding generator or employed in a superconducting rotor generator exhibiting high magnetic flux in the air-gap region between the rotor and the stator.

19 Claims, 5 Drawing Figures

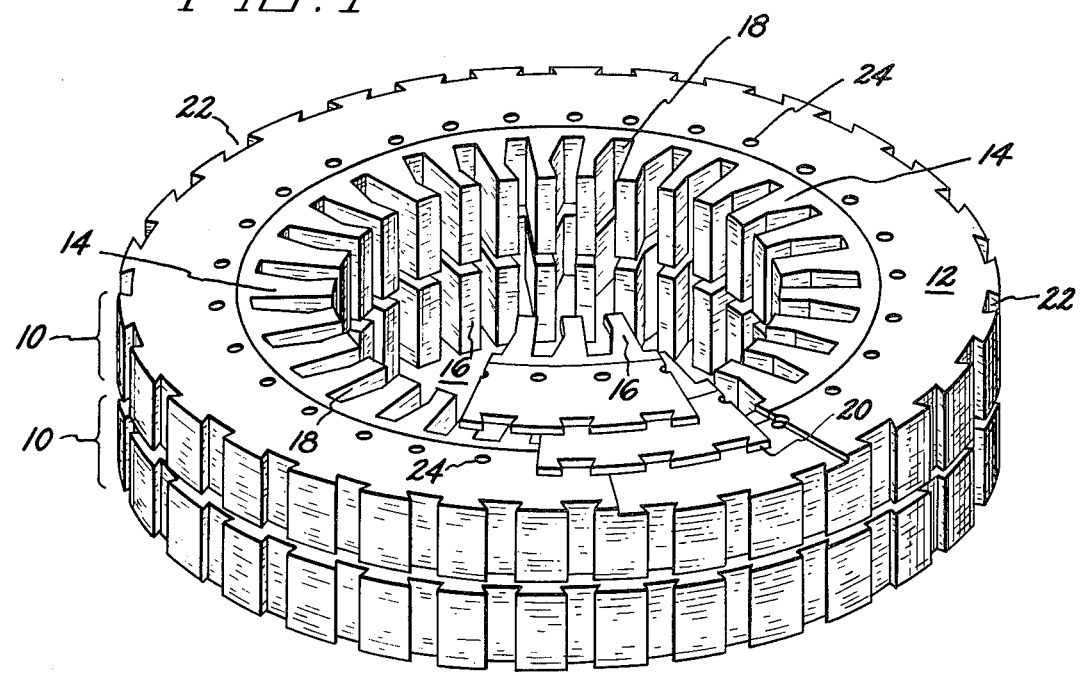
FIG. 1
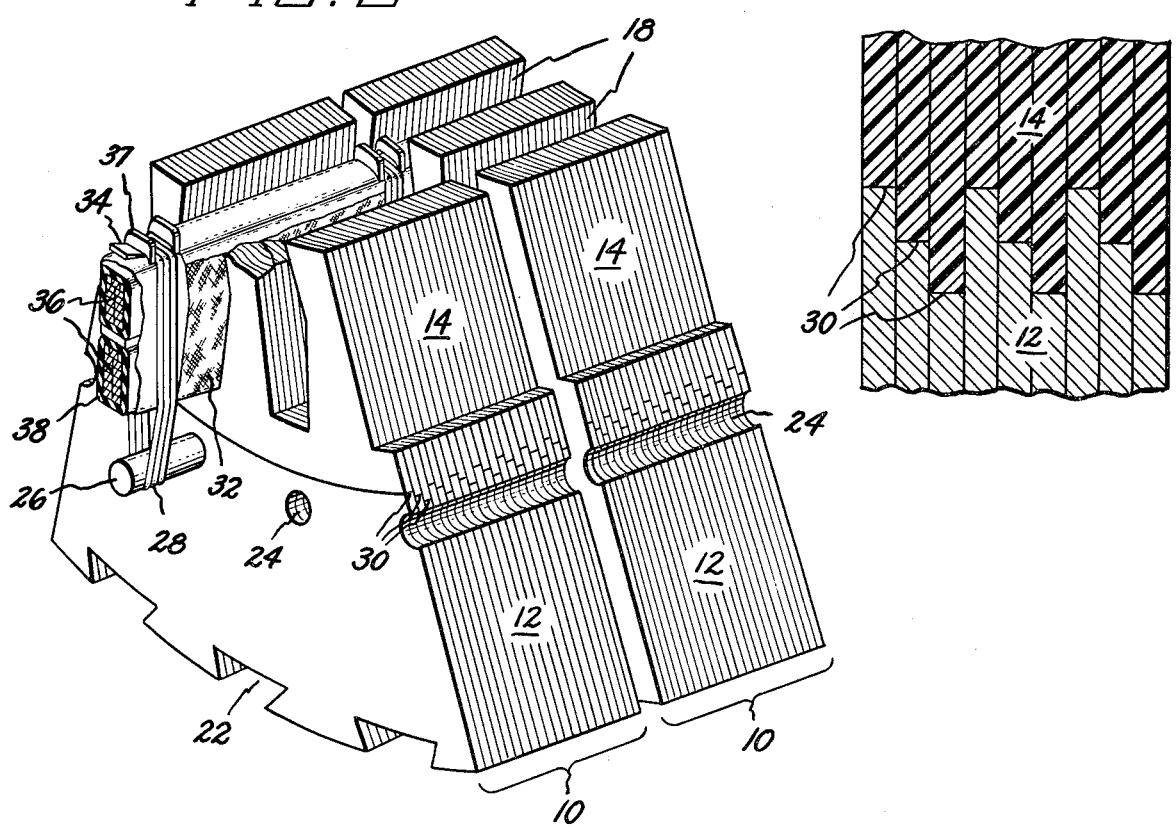
FIG. 2
FIG. 3

AIR-GAP WINDING STATOR CONSTRUCTION FOR DYNAMOELECTRIC MACHINE

BACKGROUND OF THE INVENTION

The present invention relates to stators, for dynamoelectric machines, which are particularly useful for high air-gap magnetic flux conditions, such as those produced in the use of superconducting rotors.

Generators are dynamoelectric machines generally possessing a rotor and a stator. In the typical large generator employed by electric utilities to produce electricity, a rotor is driven by a steam turbine or other source of motive force so as to produce rotational movement of the rotor within the stator assembly. The rotor is conventionally provided with field windings which are connected to energizing and excitation circuitry through the use of slip rings and carbon brushes or other electromagnetic coupling means. The rotor provides a rotating magnetic field which is radially directed with respect to the generally cylindrical rotor assembly. Because of the rotary motion, the rotor magnetic flux field is made to interact with stationary bars of insulated conductor material in the stator assembly so as to induce electrical energy in the stator winding bars. Electrical connections to the bars in the stator winding couple the generator to the typical three-phase electrical power system of most electric utilities. Various rotor and stator constructions are conventionally known in the art.

Because of increasing fuel prices, the efficiency of the turbine-generator combination has become an increasingly important parameter of interest. Increases in overall system efficiency are looked upon favorably. One method of increasing generator efficiency is through the use of superconducting rotors, that is, rotors having windings which are cooled to a temperature below which they are superconducting; that is to say, that at these lower temperatures the resistance of the conductive material employed in the rotor or field windings drops to almost zero. Because superconducting windings exhibit an extremely low value of resistance at these cryogenic temperatures, the ohmic looses in the rotor winding are almost negligible. Accordingly, undesirable thermal losses in the rotor do not occur and the overall efficiency of the machine is increased. Moreover, the level of magnetic flux provided may be significantly increased.

While the use of superconducting materials in the rotor winding provides benefits in terms of thermal and cost efficiency, nonetheless various problems arise because of the high levels of magnetic flux density present in the vicinity of the gap between the stator and the rotor. Since magnetic flux densities of up to 2 tesla may occur in such machines, it is desirable to design the stator winding support system using nonmetallic material rather than the iron teeth used in conventional design practice. The nonmetallic support system must hold the stator bars which are subjected to vibratory tangential and radial forces during normal operating conditions. During short-circuit conditions radial forces may be two hundred times greater and tangential forces twenty times greater than the forces acting on the stator bars during normal operation. It is also known that the stator core itself experiences an oscillating ellipticity during operating conditions and a greater ellipticity during short-circuit loads. The forces arising because of the electromagnetically induced reaction also tend to produce relative motion between the various portions of the stator core including the stator bars themselves. Moreover, during startups, shutdowns and load changes, thermal gradients result which cause relative movement of the winding bars within the stator slots due to thermal expansion forces. Additionally, during unusual conditions such as sudden short circuits, torques as high as eight to twenty times higher than normal can result. The stator support system must be able to transmit all of the torque developed on the stator winding bars to the core structure and eventually through the surrounding generator frame to the power station foundation itself. Additionally, it is to be noted that all of these thermal and electromagnetic forces are present in a high-voltage, high-current electrical environment and must also provide proper means of supplying electrical insulation and grounding protection. In particular, a stator bar winding support system should include a means for adequately providing ground circuit paths between the insulation on the bar windings and the frame and core assembly. All of these requirements must be met under conditions which require a large cross-sectional area for the stator windings. These stator bar windings are generally copper and are cooled separately from the rotor windings. The annular space occupied by these copper stator bars is to be maximal within the constraints imposed by the necessity of providing adequate support against the possibility of relative motion between the stator bar windings and the support structures.

Although not specifically identified as a structure useful in superconducting applications, there is apparently disclosed in U.S. Pat. No. 4,179,635 issued Dec. 18, 1979 to Heinrich Beermann, a support structure comprising an outer lamination stack in the center of which there is a hollow cylindrical nonmagnetic holding member and a further hollow inner cylinder of synthetic material which is held in place with wedges and which holds the stator bars in place in slots along the inner periphery of the cylindrical holding member. Such a structure is illustrated in FIG. 1 of the Beermann patent. The holding member is further described as comprising a nonmagnetic stainless steel. Unfortunately, this structure exhibits certain deficiencies. A particular weakness is found in the vicinity between the outer core laminations and the inner holding member. In particular, there does not appear to be any method for holding these two structures together to prevent relative rotational motion between them, such as might be induced in normal operation and by sudden short circuits, startup or other abnormal line conditions. Furthermore, the structure illustrated by the Beermann patent requires an additional structure acting to retain the stator bar windings within the stator slots. This structure unfortunately acts in a deleterious way in unnecessarily spacing the stator windings at a greater distance from the rotor than is necessary. Additionally, the holding member and the outer stack of laminations do not form an integral structure. Because of the electromagnetically induced ellipticity in the stator core, disadvantageous stresses are placed upon the holding member. Also, the holding member, being composed of stainless steel will have eddycurrent losses which reduce the efficiency of the generator.

Others have also apparently developed structures for supporting the stator winding bars in dynamoelectric machines. Examples of such structures are to be found in U.S. Pat. No. 4,068,142 issued Jan. 10, 1978 to Gillet et al., in U.S. Pat. No. 3,405,297 issued Oct. 8, 1968 to Madsen et al., in U.S. Pat. No. 3,743,867 issued July 3, 1973 to Smith, and in British Patent Specification No. 1,365,191 published Aug. 29, 1974 in the names of Preston et al. These patents generally recognize the desirability of increasing the cross-sectional area of the stator bar winding in the vicinity of the air gap. Madsen et al. are particularly cognizant of the significantly greater short-circuiting forces which can result.

SUMMARY OF THE INVENTION

In accordance with a preferred embodiment of the present invention a stator contains a stacked plurality of stator modules. Each of these modules comprises an outer metallic cylinder and an inner nonmetallic cylinder having a plurality of inwardly projecting teeth to define a plurality of slots along the inner circumference of the inner cylinder. Both cylinders have annular transverse cross sections. The outer metallic cylinder is formed from a plurality of substantially sectorially shaped metallic laminations arranged in a plurality of layers; the inner nonmetallic cylinder is formed from a similar plurality of laminations which are similarly configured. In particular the outer metallic laminations are adhesively bonded to the inner nonmetallic laminations. In one embodiment of the present invention the radial dimensions of the metallic and nonmetallic laminations vary over adjacent sequences of layers in their radial dimensions, the sum of the radial dimensions being constant, so as to define overlapping areas between the nonmetallic and metallic laminations in adjacent layers whereby the bonding area between the inner and outer cylinders is increased. Thus, an axial cross section through the stator module would indicate a mutually interdigitated sequence of laminations along the line between the inner and outer cylinders. In accordance with another embodiment of the present invention, the edges of the metallic and nonmetallic laminations which abut one another are complementarily configured so as to impede relative rotational motion between the inner and outer cylinders. In accordance with still another embodiment of the present invention the slots defined by the nonmetallic teeth widen toward their radially inner direction.

In accordance with still another embodiment of the present invention, a dynamoelectric machine comprises a stator formed from a stacked plurality of the abovedescribed stator modules and further includes stator windings in the slots and a rotor disposed within the innermost cylindrical stator opening. The rotor provides a rotating, substantially constant magnitude radially directed magnetic flux.

Accordingly, it is an object of the present invention to provide a stator for a dynamoelectric generator having superconducting field windings. It is also an object of the present invention to provide a stator structure which is easily assembled, relatively inexpensive and capable of withstanding electromagnetic forces induced by rotating magnetic fields having a flux density in the range of approximately 2 tesla. It is a still further object of the present invention to provide a stator structure employable in conventional dynamoelectric machine design.

DESCRIPTION OF THE FIGURES

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is an isometric view of the present invention illustrating two stacked stator modules.

FIG. 2 is a partial isometric view illustrating the placement of the stator winding bars in the stator slots.

FIG. 3 is a partial cross-sectional view illustrating the interdigitation between the metallic and nonmetallic laminations.

DETAILED DESCRIPTION OF THE INVENTION

Figure 4:
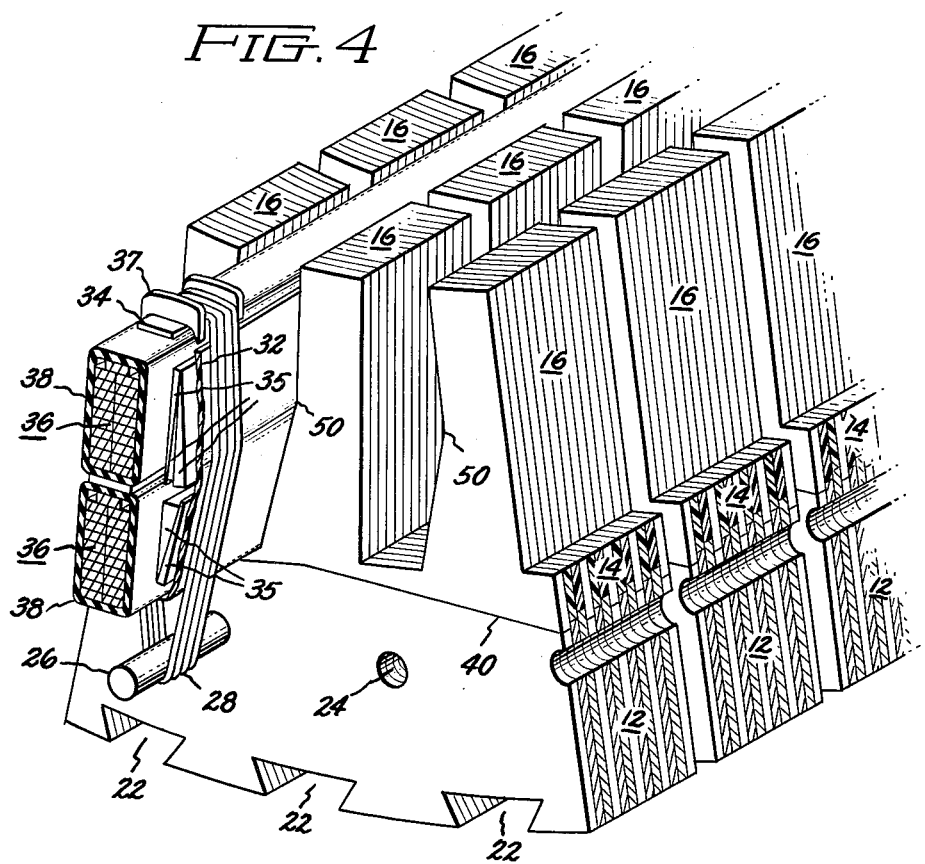
FIG. 4 is a partial isometric view of the present invention, particularly illustrating the use of complementary lamination shapes for rotation prevention.

FIG. 1 illustrates two stator modules 10 of the present invention arranged in a stacked configuration forming part of a dynamoelectric machine stator. Each of the stator modules 10 comprises an outer metallic cylindrical portion 12 and an inner nonmetallic cylindrical portion 14. The outer cylinder 12 preferably comprises sectorially shaped laminations of approximately 14 mil-thick silicon steel. The inner cylinder 14 preferably comprises laminations of a material such as glass fibers impregnated with melamine or epoxy resin. The inner cylinder 14 possesses inwardly projecting teeth aligned so as to form slots 18 for the stator bar windings (not shown in FIG. 1 for clarity). The laminations comprising the outer metallic cylinder 12 preferably possess slots 22 which are aligned in the stacking process so as to form dovetail slots which mate with keybars located in the frame surrounding the dynamoelectric machine. Such structure is conventionally known in the art and, for example, is shown in U.S. Pat. No. 3,652,889 issued Mar. 28, 1972 to Reece et al. The outer metallic laminations are also provided with holes 24 for the insertion of rods (26 in FIG. 2). The function of these rods is described below. Preferably there is one such hole 24 for each slot 18. In a partially exploded fashion, there is also shown in FIG. 1 a composite lamination 20 comprising an outer metallic portion and an inner, toothed nonmetallic portion. While each such structure 20 may comprise a single lamination of nonmetallic and metallic material, a doublet or triplet structure having overlapping features is preferred depending on the order of assembly. FIGS. 2 and 3 both illustrate this overlapping configuration which significantly aids bonding of the nonmetallic to the metallic laminations.

FIG. 2 particularly illustrates the structure for holding the winding bars in the slots 18. These windings comprise an inner conductive core 36, preferably copper, surrounded by an insulating layer 38. Prior to placement within the slot, the slot is fitted with a liner 32 comprising an inert, semiconducting material such as carbon-filled epoxy and glass fibers. Rods 26 are fitted through holes 24 in the metallic outer cylindrical portion 12 and it is to these rods 26 that the stator bar windings are affixed by means of wrapping material 28. This wrapping material preferably comprises glass fiber impregnated with a curable epoxy resin. Such wrapping methods are shown, for example, in U.S. Pat. No. 3,437,859 issued Apr. 10, 1969 to Edward Gibbs et al. Tightening wedges 34 and cap 37 are employed to ensure a tight fit to prevent movement of the stator bar windings within the slots 18.

A very significant portion of FIG. 2 is illustrated by boundaries 30 which exist between the non-metallic laminations in inner cylinder 14 and the metallic laminations of outer cylinder 12. It is seen in the figure that the radii of these sectorially shaped sections vary from layer to layer so as to form an interditigated boundary between the inner cylinder 14 and outer cylinder 12. This interdigitation provides an overlapping area for adhesively bonding the inner cylinder 14 to the outer cylinder 12. While the radii of the inner and outer lamination sectors are varied to form an interdigitated structure, the sum of the radial dimensions of the metallic and nonmetallic sectors is constant so that the outer circumference of the resultant stator assembly is constant along with the inner diameter of the hollow portion of the stator assembly. It is noted that a triplet structure is shown in the figure. However, doublet, quadruplet, or even quintuplet structures may be employed. Whether the structure is assembled from single layers of laminations or layers of grouped laminations, consistency is maintained so as to produce a stator module of uniform thickness, inner diameter and outer diameter. FIG. 3 shows a detailed representation of this structure so as to more particularly illustrate the interdigitated and overlapping boundary between the inner and outer cylinders.

FIG. 4 more clearly illustrates another important feature of the present invention in which, it is particularly seen that the slots 18 narrow in the radially inner direction. In particular, the slots narrow starting at a point 50 as shown. This narrowing or tapering of the slot is significant in that, after the bars are assembled, wedged and potted in place, the tapered slot acts as a wedge to resist movement due to forces on the stator bar windings which act in a radial direction. Tangential movement of the stator windings is resisted by the arch bound structure which results from completely filling the slots with bars 36, wedges 35 and potting compound, which fills voids in the slots.

FIG. 4 also illustrates another important feature of the present invention. In particular, it is seen that nonmetallic laminations 14 abut corresponding metallic laminations along a line 40 as shown. In FIG. 4 line 40 is not an arc of a circle as is the case in the previous figures. Other irregular, but complementary, lines of abutment between the inner and outer cylinder may be employed to prevent relative rotary motion between the inner cylinder 14 and the outer cylinder 12. Thus, this function need not be provided by the rods 26 and teeth 16 alone. As indicated, other abutment lines other than that illustrated by reference numeral 40 may be employed. The principal criteria for these lines is that concave and convex surfaces are formed in corresponding inner and outer cylindrical portions.

A significant feature of the present invention is that three distinct lamination parts are not required for a triplex structure. A sectorially shaped lamination with three keybar slots 22, for example, is sufficient. As each lamination is put in place it is shifted one keybar position with respect to the previously placed piece. Thus with the boundary 40 as shown the overlay structure is automatically produced. This is indicated by the crosshatching in FIG. 4. Other multiplexed structures are similarly possible but with changes in the size and number of teeth per lamination.

Figure 5:
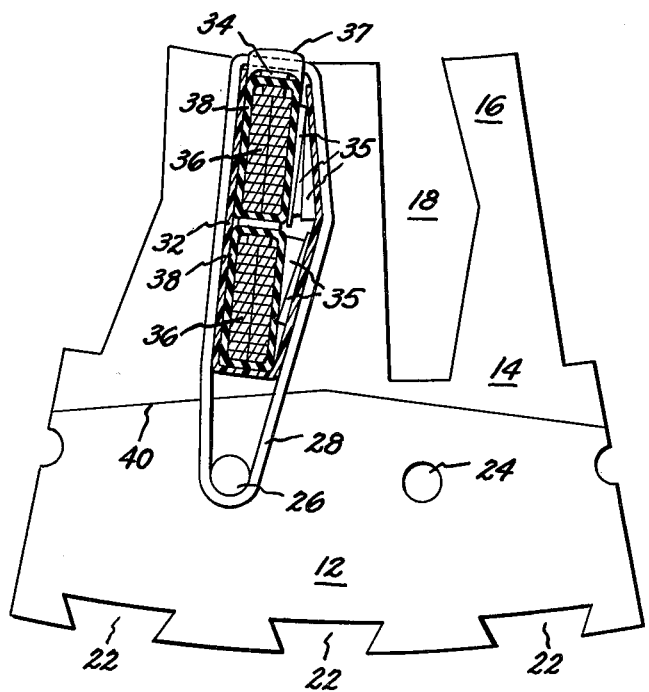
FIG. 5 is a partial cross-sectional view illustrating the use of wedges in the stator slots.

FIG. 5 shows abutment line 40 from an end view. Likewise, another wedge shape and wrapping path are shown in the view of FIG. 5.

The stator modules of the present invention may be stacked as shown in the figures to form an entire stator structure into which a rotor is disposed for the purpose of providing a rotating field of magnetic flux cutting across the stator bar windings 36, thereby inducing currents therein for the purpose of providing power to external circuits and transmission lines. The metallic laminations may be conveniently fashioned from stamped portions as may be the nonmetallic sectorially shaped laminations.

In order to provide grounding protection for the stator bar insulation, the wrap 28 may comprise an impregnated glass fiber tie in which the epoxy resin itself is slightly conducting, that is to say, it has a conductivity between the conductivity of the metal laminations and the conductivity of the nonmetallic laminations.

In accordance with a preferred embodiment of the present invention the stator core is manufactured in roughly six-inch thick modules. The outer cylindrical portion comprises 0.014 inch thick silicon iron similar to presently available core punchings. The epoxy/glassfiber teeth may likewise be made from 14-mil thick punchings. The interface between the inner and outer cylinders is as shown in FIG. 3. The six-inch modules are stacked in a horizontal position. Steel and nonmetallic punchings are built up alternately as the module is constructed. After the six-inch height is completed, vacuum impregnation or other similar operation is used to ensure complete bonding of the steel punchings and the nonmetallic punchings together and to themselves. These bonded modules are then assembled to the spring bar dovetails in the frame to make up the complete core and support assembly. The tooth design has a taper on one side, which feature provides a means for holding the bars in the slot under those conditions in which the bars are subjected to various electromagnetic reaction forces. Before the bars are assembled in the slot, a slot liner is provided. This liner is made from low conductive epoxy/glass fiber material. The liner preferably is coated with a mold release compound on the surface adjacent to the teeth. The liner provides several functions. First, the liner acts as a mold to allow complete compound potting of the bars in the slot. Second, the mold release provides a slip plane to accommodate relative thermal expansion and contraction between the bars and the punchings. Third, the slight conductivity feature of the resin in the liner provides for means for shorting the outside bar armor to ground. After the bars are potted in place, wrapped glass ties are assembled every six inches along the core. These glass wraps are similar to those used in present generator end winding designs. Between the top of the radially inner bar and the inside surface of the glass tie, wedges are employed to permit pretensioning of the glass ties. This pretensioning assures that the bars do not vibrate excessively under normal operating bar loads. These wedges may be retightened if looseness develops due to relaxation or compression creep of the assembly.

From the above, it may be appreciated that the stator modules of the present invention provide a sound and durable structure for positioning stator bar winding conductors as closely and as compactly as possible in the magnetic flux of the gap between the rotor and stator of a dynamoelectric machine, while at the same time assuring that the stator teeth are nonmetallic but yet provide rigid support. It is also appreciated that the present invention is particularly useful in those machines employing a superconducting rotor in which the magnetic flux is of sufficient intensity to cause significant deleterious heating effects and losses in any metallic tooth structure used to hold the stator windings. Moreover, the present invention provides advantageously shaped stator slots. Additionally, there is provided advantageously shaped abutments between the inner and outer laminations along with an interdigitated structure which significantly increases the adhesive bonding capability between the inner and outer cylinders.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A stator module for a dynamoelectric machine comprising:
    an outer, metallic cylinder formed from a plurality of substantially sectorially shaped metallic laminations arranged in a plurality of layers;
    an inner, nonmetallic cylinder formed from a plurality of substantially sectorially shaped non-metallic laminations having inwardly projecting teeth so as to define a plurality of slots along the inner circumference of the inner cylinder, said laminations also being arranged in a plurality of layers, said inner laminations being adhesively bonded to said outer laminations; and
    wherein the radial dimensions of said metallic and non-metallic laminations vary over adjacent layers, sum of said radial dimensions being constant, so as to define overlapping areas between the metallic and nonmetallic laminations in said adjacent layers.

2. The stator module of claim 1 in which the edges of said metallic and nonmetallic laminations which abut each other are complementarily configured to impede relative circumferential motion between said inner nonmetallic cylinder and said outer metallic cylinder.

3. The stator module of claim 1, in which one lateral surface of each of said projecting teeth has a medial angular cut for inserting wedges.

4. The stator module of claim 1 in which said laminations comprise punchings.

5. The stator module of claim 1 in which said nonmetallic laminations comprise glass fibers impregnated with material selected from the group consisting of melamine resin and epoxy resin.

6. The stator module of claim 1 in which said outer metallic cylinder possesses longitudinal slots along the exterior circumference thereof, whereby the module may be inserted and aligned in a stator frame.

7. The stator module of claim 1 in which said metal laminations comprise a material having high magnetic permeability.

8. A stator comprising:
    a plurality of longitudinally stacked stator modules according to claim 1; and
    an insulated winding disposed within said slots.

9. The stator of claim 8 in which at least some of said stator modules are spaced apart by annular spacers.

10. The stator of claim 8 in which nonmetallic rods are longitudinally disposed through the outer metallic cylinder defined by said modules.

11. The stator of claim 10 in which there is a nonmetallic rod disposed longitudinally and aligned radially with each slot.

12. The stator of claim 8 further comprising a slot liner disposed between said winding and said slots.

13. The stator of claim 8 in which said winding is wedged and potted into said slots.

14. The stator of claim 8 further comprising:
    annular spacers disposed between said stacked stator modules;
    nonmetallic rods longitudinally disposed through the outer metallic cylinder defined by said modules; and
    means to fasten said windings to said nonmetallic rods in the region between said stacked modules.

15. The stator of claim 14 in which said fastening means comprises epoxy resin impregnated, glass fiber ties.

16. The stator of claim 14 in which said fastening means exhibits a conductivity between the conductivity of the metallic laminations and that of the stator bar insulation.

17. The stator of claim 8 in which one lateral surface of each of said projecting teeth has a medial angular cut for inserting wedges.

18. The stator of claim 17 further comprising:
    longitudinal slot wedges disposed along the wider portion of said slots.

19. A dynamoelectric machine comprising:
    the stator of claim 8; and
    means disposed within said inner cylindrical opening for providing a rotating, substantially constant, radially directed magnetic flux.

* * * * *